(12) United States Patent
Seibold

(10) Patent No.: US 10,532,680 B2
(45) Date of Patent: Jan. 14, 2020

(54) HEADREST, A SEAT COMPRISING A HEADREST AND A METHOD OF ACTUATING A HEADREST

(71) Applicant: Adient Luxembourg Holding S.à.r.l., Luxembourg (LU)

(72) Inventor: Kurt Seibold, Farmington Hills, MI (US)

(73) Assignee: Adient Luxembourg Holding S.à.r.l., Luxembourg (LU)

( * ) Notice: Subject to any disclaimer, the term of this patent is extended or adjusted under 35 U.S.C. 154(b) by 0 days.

(21) Appl. No.: 15/720,763

(22) Filed: Sep. 29, 2017

(65) Prior Publication Data

US 2018/0093594 A1 Apr. 5, 2018

Related U.S. Application Data

(60) Provisional application No. 62/402,249, filed on Sep. 30, 2016.

(51) Int. Cl.
*B60N 2/806* (2018.01)
*B60N 2/885* (2018.01)
*B60N 2/891* (2018.01)

(52) U.S. Cl.
CPC ............ *B60N 2/806* (2018.02); *B60N 2/885* (2018.02); *B60N 2/891* (2018.02)

(58) Field of Classification Search
CPC ........ B60N 2/806; B60N 2/885; B60N 2/891; B60N 2/879; B60N 2002/899
See application file for complete search history.

(56) References Cited

U.S. PATENT DOCUMENTS

| | | | | |
|---|---|---|---|---|
| 2,864,433 | A * | 12/1958 | Schnoor | A47C 7/38 297/404 |
| 6,220,668 | B1 * | 4/2001 | Scheffzuck | B60N 2/803 297/391 |
| 6,601,804 | B2 * | 8/2003 | Bisch | A47C 7/383 248/118 |
| 6,648,416 | B2 * | 11/2003 | O'Connor | A47C 7/383 297/397 |
| 6,938,958 | B2 * | 9/2005 | Gold | A47C 7/386 297/393 |
| 7,448,678 | B2 * | 11/2008 | Browne | A47C 7/38 297/216.12 |
| 8,857,904 | B2 * | 10/2014 | Gaeng | B60N 2/42709 297/216.12 |
| 8,950,813 | B2 * | 2/2015 | Nawaz | B60N 2/806 297/406 |
| 9,238,427 | B2 * | 1/2016 | Baumgarten | B60N 2/888 |

(Continued)

*Primary Examiner* — Philip F Gabler
(74) *Attorney, Agent, or Firm* — Marshall & Melhorn, LLC

(57) ABSTRACT

A headrest including a resilient headrest structure. The resilient headrest structure has a resilient headrest structure surface. The resilient headrest structure surface defines a non-planar contour, in particular an arcuate contour, when the resilient headrest structure is fixed between two points. The resilient headrest surface defines a planar contour when the resilient headrest structure is released. Due to the material properties of the resilient headrest structure, the resilient headrest structure surface automatically returns to the planar contour from the non-planar contour when the resilient headrest structure is released.

14 Claims, 17 Drawing Sheets

(56) References Cited

U.S. PATENT DOCUMENTS

| | | | |
|---|---|---|---|
| 2003/0178880 A1* | 9/2003 | Hannah | A61G 5/12 297/406 |
| 2014/0339875 A1* | 11/2014 | Sunaga | B60N 2/58 297/408 |
| 2016/0046219 A1* | 2/2016 | Schauf | B60N 2/885 297/391 |
| 2017/0197530 A1* | 7/2017 | Line | B60N 2/885 |
| 2018/0154810 A1* | 6/2018 | Flynn | B60N 2/868 |

* cited by examiner

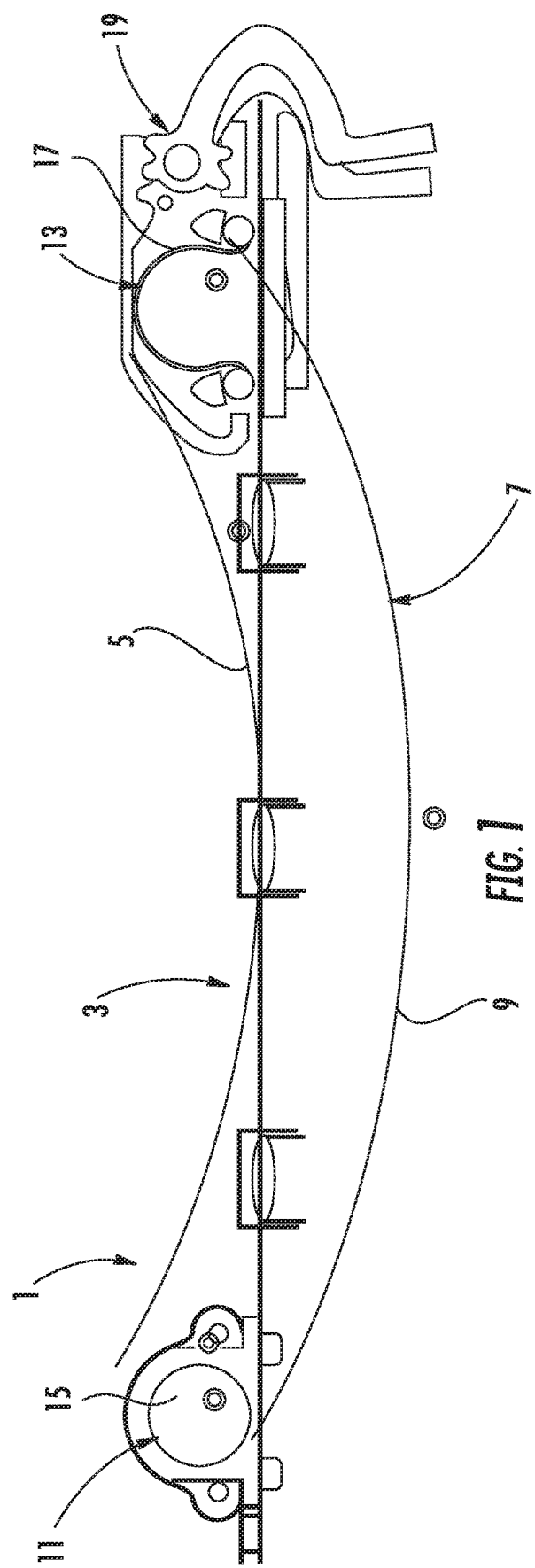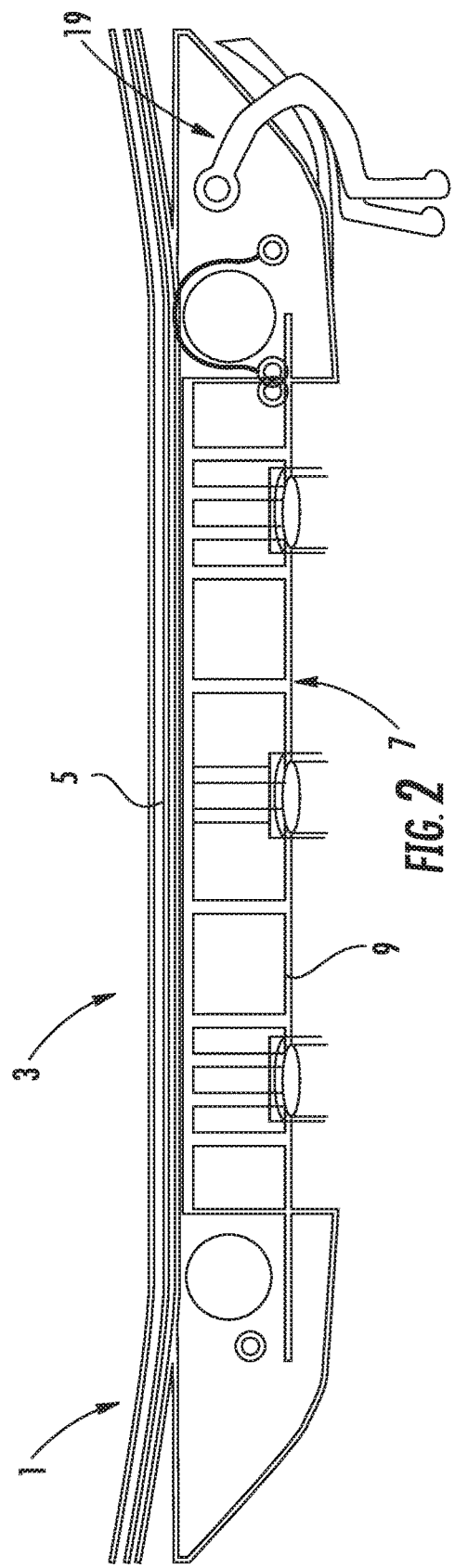

HEADREST, A SEAT COMPRISING A HEADREST AND A METHOD OF ACTUATING A HEADREST

CROSS REFERENCE TO RELATED APPLICATIONS

This application claims the benefit of priority of U.S. provisional application 62/402,249 filed Sep. 30, 2016, the entire contents of which are incorporated herein by reference.

FIELD OF THE INVENTION

The present invention relates to a headrest and a seat, particularly a vehicle seat, that comprises the headrest, and a method of actuating the headrest.

BACKGROUND OF THE INVENTION

Conventional headrests do not provide a contour that fits a user's head, which does not provide for a comfortable user experience. Even if conventional headrests do allow for a customized support of a user's head, such headrests have complicated designs and are expensive to manufacture. Further, such conventional headrests are aesthetically unpleasing and do not function in a proper manner.

SUMMARY OF THE INVENTION

An object of the present invention is to provide a headrest that can change shape without having a complicated design.

According to the present invention, a headrest comprises a resilient headrest structure. The resilient headrest structure comprises a headrest structure surface that defines a non-planar contour, in particular an arcuate contour, when the resilient headrest structure is fixed between two points. The headrest structure surface defines a planar contour when the headrest structure is released. The headrest structure surface automatically returns to the planar contour from the non-planar contour when the resilient headrest structure is released.

The resilient headrest structure may be an adjustable steel band.

The headrest may further comprise a release mechanism connected that is connected to the resilient headrest structure. The release mechanism may comprise an actuator. The actuator may be movable between at least a first position and a second position. The resilient headrest structure may be in a fixed position with the actuator in the first position. The resilient headrest structure may be moved when the actuator in the second position.

The headrest structure surface may change between the arcuate contour and the planar contour after the actuator is released. The actuator may retain a defined contour of the headrest structure surface The headrest may further comprise a headrest support structure connected to the resilient headrest structure. The headrest support structure may comprise a non-planar headrest support structure contour, particularly an arcuate headrest support structure contour, and the resilient headrest structure may comprise the arcuate contour when the actuator is in a lock position.

The headrest support structure may comprise a planar headrest support structure contour and the resilient headrest structure may comprise the planar contour upon release of the actuator.

The headrest may further comprise a headrest support structure. The headrest support structure and the resilient headrest structure may automatically return to a planar configuration from an arcuate configuration upon release of the actuator.

The headrest support structure may define one of a front surface and a rear surface of the headrest and the resilient headrest structure may define another one of the front surface and the rear surface of the headrest.

The resilient headrest structure may comprise a first length when the resilient headrest structure comprises the arcuate contour. The resilient headrest structure may comprise a second length when the resilient headrest comprises the planar contour. The first length may be greater than the second length.

A length of the headrest support structure may be the same with the actuator in the first position and with the actuator in the second position.

Each of the two fixed points may be defined by a headrest support member.

According to the present invention, a headrest comprises a resilient headrest structure and a release mechanism. The release mechanism comprises a first state and a second state. The resilient headrest structure comprises a non-planar contour, in particular an arcuate contour, with the release mechanism in the first state. The resilient headrest structure comprises a planar contour with the release mechanism in the second state.

The headrest support structure may comprise a non-planar headrest support structure contour, in particular an arcuate headrest support structure contour, with the release mechanism in the first state. The headrest support structure may comprise a headrest support structure planar contour with the release mechanism in the second state.

A parallel spring may provide torsion about at least one of the two fixed points.

Material properties of the resilient headrest structure returns the headrest structure surface to the planar contour According to the present invention, a vehicle seat comprises a vehicle seat structure and a headrest having the features according to the present invention. The headrest is connected to the vehicle seat structure.

According to the present invention, a method comprises providing a headrest structure comprising a resilient headrest structure. The resilient headrest structure is changed from a planar configuration to a non-planar configuration, in particular an arcuate configuration. The resilient headrest structure comprises a planar contour in the planar configuration. The resilient headrest structure comprises a non-planar contour, in particular an arcuate contour, in the arcuate configuration. The resilient headrest structure is allowed to fix itself in the non-planar configuration after the resilient headrest structure changes from the planar configuration to the non-planar configuration. The resilient headrest structure is released such that the resilient headrest structure automatically changes from the non-planar configuration to the planar configuration.

According to the present invention, a suspension system for a headrest comprises a headrest structure. The headrest structure comprises a planar state and a non-planar state. The headrest structure comprises a planar contour in the planar state. The headrest structure comprises an arcuate contour in the non-planar state. The headrest structure is pre-loaded such that the headrest structure changes from the non-planar state to the planar state.

The headrest structure may comprise elastomeric material. The headrest structure may changes from the non-planar state to the planar state via at least the elastomeric material.

The suspension system may further comprise a driver device. The headrest structure may change from the non-planar state to the planar state via at least the driver device.

The suspension system may further comprise a constraining device on one side of the headrest structure. The arcuate contour in the non-planar state of the headrest structure may be maintained via the constraining device.

The suspension system may further comprise another constraining device on another side of the headrest structure. The arcuate contour in the non-planar state of the headrest structure may be maintained via the constraining device and the another constraining device.

The driver device may comprises a lock mechanism. The lock mechanism may comprise a locked state and an unlocked state. The headrest structure may be in a fixed position in a vertical direction when the lock mechanism is in the locked state. The headrest structure may be movable in the vertical direction when the lock mechanism is in the unlocked state.

The suspension system may further comprise a lock mechanism. The lock mechanism may comprise a locked state and an unlocked state. The headrest structure may be in a fixed position in a vertical direction when the lock mechanism is in the locked state. The headrest structure may be movable in the vertical direction when the lock mechanism is in the unlocked state.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 1 is a sectional view of a headrest structure having a non-planar contour;

FIG. 2 is a sectional view of the headrest structure of FIG. 1 with the headrest structure having a substantially planar contour;

DESCRIPTION OF THE PREFERRED EMBODIMENTS

Figure 3:
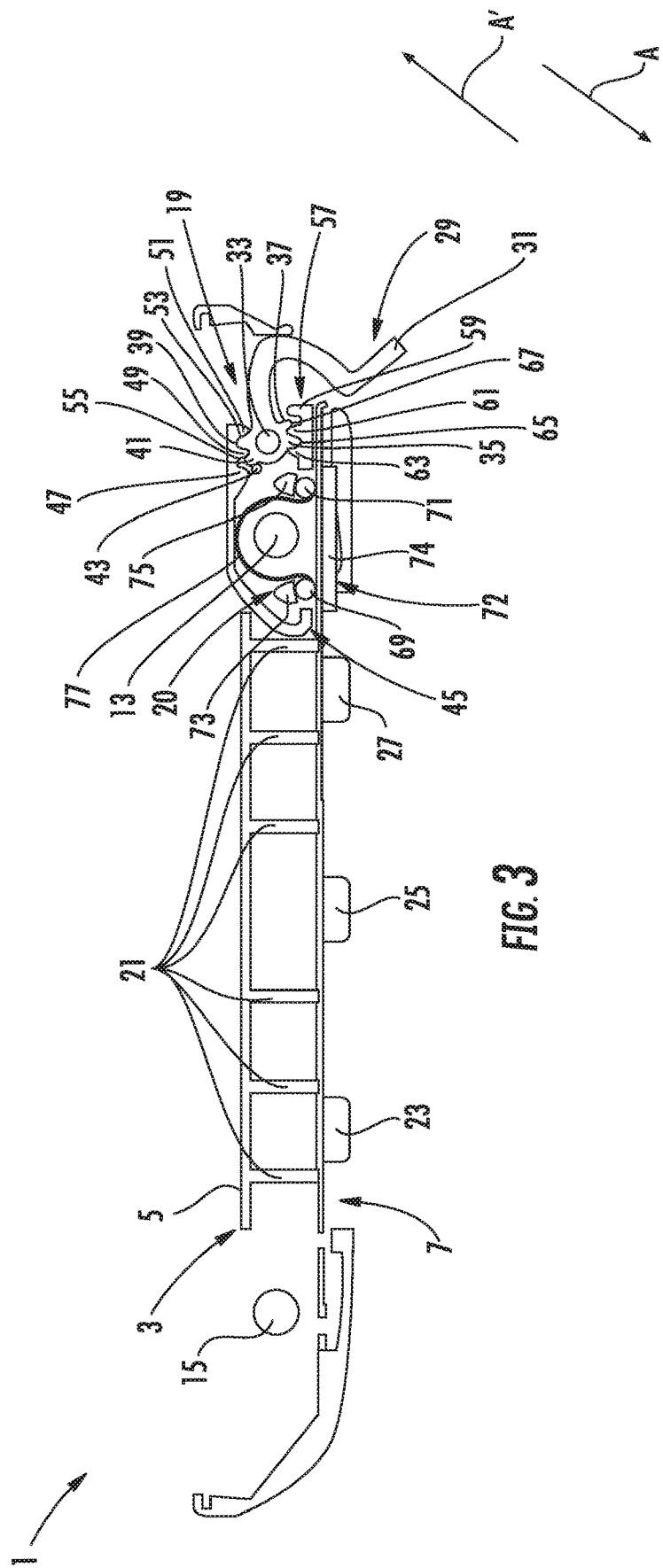
FIG. 3 is a sectional view of the headrest structure of FIG. 2.

Referring to the drawings in particular, FIG. 1 is a sectional view of a headrest structure 1. The headrest structure 1 includes a head support structure 3 and a resilient headrest structure 7. The head support structure 3 is connected to the resilient headrest structure 7. The head support structure 3 has a head support structure surface 5. The head support structure surface 5 forms a front surface of the headrest structure 1 for supporting a head of a user. The head support structure 3 is shown in the form of a compliant band, however it is understood that any suitable structure may be used to form the head support structure 3. The resilient headrest structure 7 has a resilient headrest structure surface 9. The resilient headrest structure 7 is shown as a band of semi compliant material, in particular spring steel, however it is understood that any suitable structure may be used to form the resilient headrest structure 7. The resilient headrest structure 7 forms a rear surface of the headrest structure 1. In another embodiment, the resilient headrest structure 7 may be arranged in front of the head support structure 3 such that the resilient headrest structure 7 forms a front surface of the headrest structure and the head support structure 3 defines a rear surface of the headrest structure. The headrest structure 1 is connected to a headrest support member 11 and a headrest support member 13. The headrest support member 11 is shown in the form of a rod 15, but it is understood that the headrest support member 11 may be formed of any other suitable structure. The headrest support member 13 is shown in the form of a rod 17, but it understood that the headrest support member 13 may be formed of any other suitable structure. The head support structure 3 extends between the head rest support member 11 and the headrest support member 13. At least a portion of the resilient headrest structure 7 extends between the headrest support member 11 and the headrest support member 13.

A release mechanism 19 is connected to the resilient headrest structure 7 for releasing a latching mechanism 20. The release mechanism 19 is movable between a first position (non-engaged position) and a second position (engaged position). When the release mechanism 19 moves from the first position to the second position, the release mechanism 19 engages the latch mechanism 20 such that the latch mechanism 20 moves from a fixed position to a release position. When the latch mechanism 20 is in the release position, the resilient headrest structure 7 is released from a fixed position so that a user can rotate the head support structure 3 and the resilient headrest structure 7 with the user's hand or hands or by pushing on the head support structure 3 or by pressing a rear surface of the user's head on the headrest structure 1. When the user moves the head support structure 3 and the resilient headrest structure 7 after the release mechanism 19 moves the latch mechanism 20 such that the resilient headrest structure 7 is released, the head support structure surface 5 remains at a constant length and the head support structure surface 5 has an arcuate contour when the user presses against the head support structure 3 and the resilient headrest structure 7 as shown in FIG. 1. When the user presses against the head support structure 3 and the resilient headrest structure 7 with the latch mechanism 20 in the released position, the resilient headrest structure 7 becomes longer as it rotates about the headrest support member 11 and the headrest support member 13 as shown in FIG. 1. After the user presses against the head support structure 3 and the resilient headrest structure 7 to provide the head support structure 3 and the resilient headrest structure 7 with an arcuate contour, a force is removed from the release mechanism 19, which allows the latching mechanism 20 to move from the release position to the fixed position to fix the head support structure 3 and the resilient headrest structure 7 and maintain the arcuate contour of the head support structure 3 and the resilient headrest structure 7. When the release mechanism 19 is again actuated from the first position to the second position, the latch mechanism 20 moves from the fixed position to the release position and releases the resilient headrest structure 7, which causes the head support structure 3 and the resilient headrest structure 7 to move such that the head support structure 3 and the resilient headrest structure 7 have a substantially linear (flat, planar) contour as shown in FIG. 2.

Figure 4:
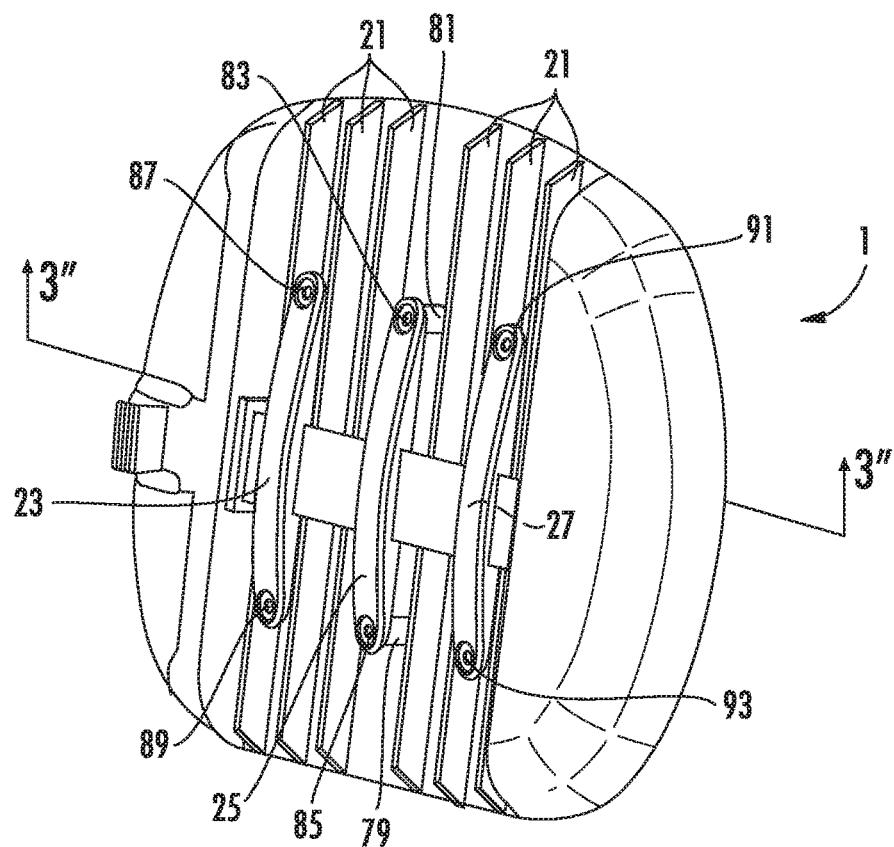
FIG. 4 is a rear perspective view of the headrest structure of FIG. 1.

FIG. 3 is a sectional view of the headrest structure 1 according to line 3"-3" of FIG. 4. The head support structure 3 is connected to webs 21. The head support structure 3 may be integrally connected to the webs 21 as shown in FIG. 3. Although six webs 21 are shown in FIG. 3, it is understood that any number of webs 21 may be connected to head support structure 3. In another embodiment (not shown), the webs 21 may be formed separate from the head support structure 3. A supporting member 23, a supporting member 25 and a supporting member 27 are connected to the head support structure 3. Although three support members are shown in FIG. 3, it is understood that any number of support members may be provided. The resilient headrest structure 7 extends between the supporting member 23, the supporting member 25 and the supporting member 27 and the webs 21. The supporting member 23, the supporting member 25 and the supporting member 27 fix the resilient headrest structure 7 to the head support structure 1.

The release mechanism 19 has an actuator 29. In FIG. 3, the actuator 29 is a lever 31, however it is understood that the actuator may be a push button, a switch, a toggle switch or any other suitable actuator structure. The actuator 29 is pivotably connected to a shaft 33 so that the actuator 29 is movable relative to the shaft 33. The lever 31 has teeth 35, 37, 39, 41. The lever 31 engages a shaft 43. The shaft 43 limits rotation of the lever 31 and only allows limited rotational movement of the lever 31. The lever 31 contacts a release member 45. The release member 45 has teeth 47, 49, 51 that interact and engage with the teeth 39, 41 of the lever 31. Tooth 47 and tooth 49 define a space 55 for receiving at least a portion of tooth 41. Tooth 49 and tooth 51 define a space 53 for receiving at least a portion of tooth 39. The lever 31 contacts a release member 57. The release member 57 has teeth 59, 61, 63 that interact and engage with the teeth 35, 37 of the lever 31. Tooth 59 and tooth 61 define a space 67 for receiving at least a portion of tooth 37 of the lever 31. Tooth 61 and tooth 63 define a space 65 for receiving at least a portion of tooth 35.

The latch mechanism 20 includes a pin 69, a pin 71, a fixing element 72, a fixing element 73, a fixing element 75 and a spring (driver device) 77. The pin 69 and the pin 71 are arranged adjacent to the resilient headrest structure 7 on one side of the resilient headrest structure 7. The fixing support structure 72 is arranged adjacent to the resilient headrest structure 7 on another side of the resilient headrest structure 7. The fixing support structure 72 is shown in the form of a plate 74, however it is understood that any suitable support structure may be provided. The fixing element 73 is arranged opposite the resilient headrest structure 7. The fixing element 73 is in contact with the pin 69. A fixing element 75 is arranged opposite the fixing element 73 and the resilient headrest structure 7. The fixing element 75 is in contact with the pin 71. The spring 77 extends about a portion of the headrest support member 13. The end portions of the spring 77 are located at a spaced location from each other. The fixing element 73 and the fixing element 75 are located at a spaced location from the spring 77. The fixing element 73 and the fixing element 75 are preferably in the form of wedges. The pin 69 engages the spring 77, particularly a first end portion of the spring 7. The pin 71 engages the spring 77, particularly a second end portion of the spring 77. FIG. 3 shows the latch mechanism 20 in the fixed position. When the actuator 29 is rotated in a clockwise direction A, a user can press his or her head or his or her hand or hands against the headrest support structure 3 to provide the headrest support structure 3 and the resilient headrest structure 7 with a non-planar contour, preferably an arcuate contour, and the actuator 29 can then be released allowing the spring 77 to drive actuator 29 in the counter-clockwise direction A', which in turn allows spring 77 to apply a force against the pin 69 and the pin 71 such that the pin 69 and the pin 71 are pushed between wedges 73 and 75 thereby inhibiting motion in either direction of the resilient headrest structure 7, which will maintain the arcuate contour of the resilient headrest structure 7 and the arcuate contour of the headrest support structure 3. When the actuator 29 is rotated in the clockwise direction A from the first position to the second position, the release member 45 moves in a direction of the pin 69 (to the right in FIG. 3) to contact the pin 69 and the release member 57 moves in a direction of the pin 71 (to the left in FIG. 3) to contact the pin 71. When the actuator 29 is rotated in the clockwise direction A, the release member 45 moves in the direction of the pin 69 (to the right in FIG. 3) and engages the pin 69 to move the pin 69 away from the fixing element 73 to press the pin 69 against the spring 77 so that the pin 69 compresses the spring 77 and the release member 57 moves in a direction of the pin 71 (to the left in FIG. 3) to press the pin 71 against the spring 77 so that the pin 71 compresses the spring 77. By moving the pin 69 in a direction away from the fixing element 73 toward the spring 77 and moving the pin 71 away from the fixing element 75, the resilient headrest structure 7 is free to move. When the actuator 29 is rotated in the clockwise direction A after the arcuate contour of the resilient headrest structure 7 is formed, the resilient headrest structure 7 is no longer fixed between the fixing support structure 72 and the pin 69 via the fixing element 73 and the pin 71 via the fixing element 75, which allows the resilient headrest structure 7 to return to a linear (flat, planar) contour due to the properties of the material of the resilient headrest structure 7. When the actuator 29 is rotated in the clockwise direction A, the contour of the resilient headrest structure 7 and the contour of the headrest support structure 3 can be altered by the user.

Figure 5:
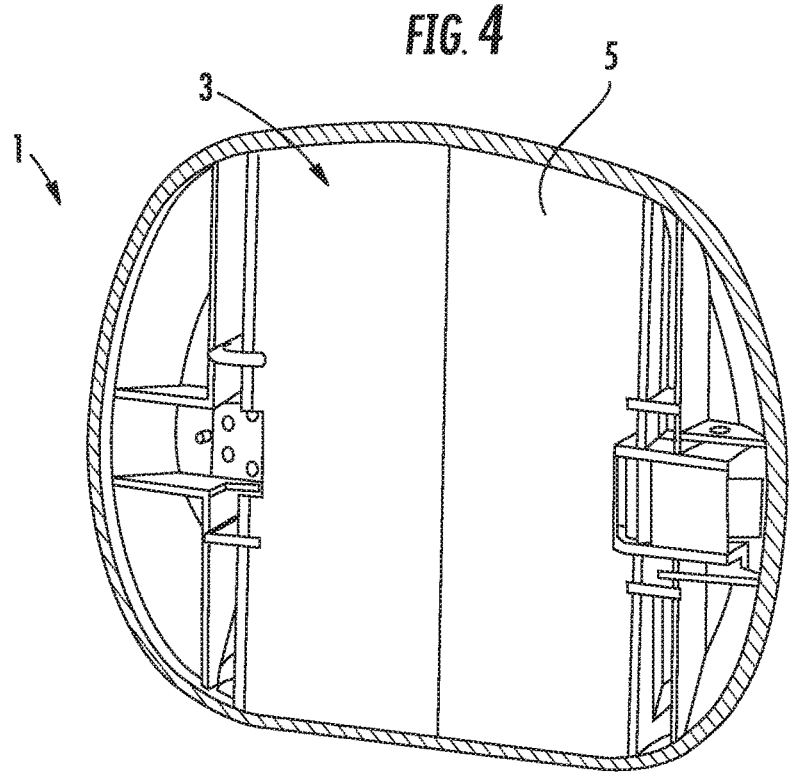
FIG. 5 is a front perspective view of the headrest structure of FIG. 2.

FIG. 5 is a front view of the headrest structure 1. The user applies his or her head against headrest support structure surface 5 so that the headrest structure 1 supports the user's head.

Figure 6:
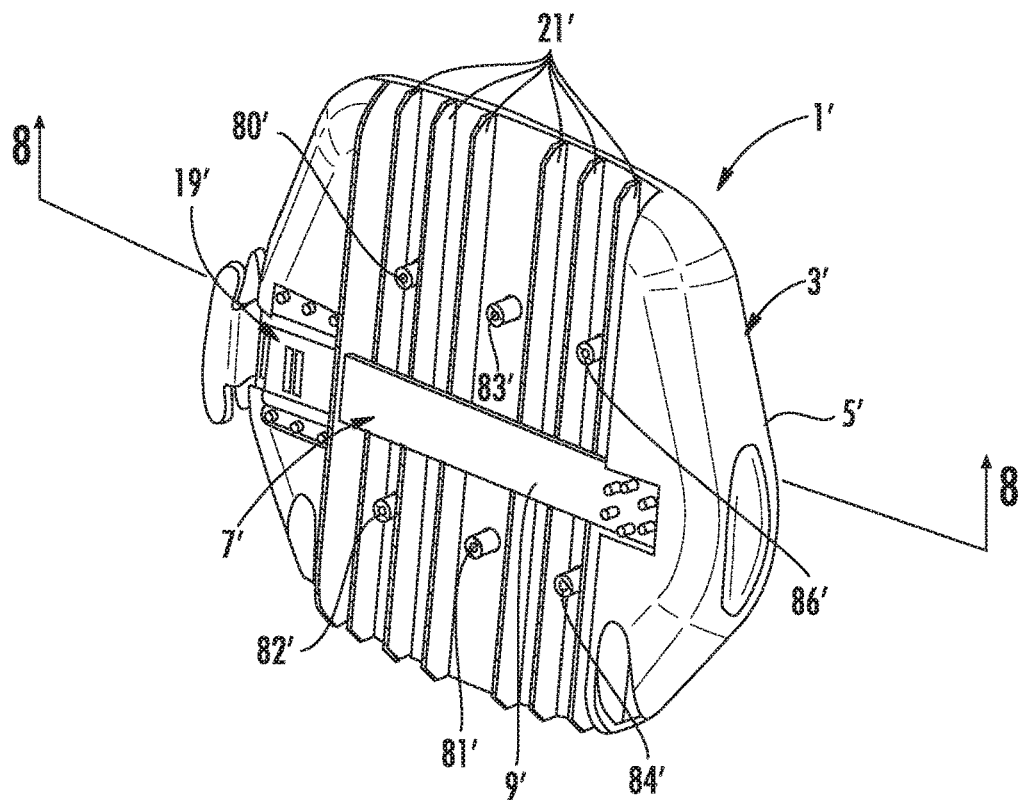
FIG. 6 is a rear perspective view of another embodiment of a headrest structure.

FIG. 4 is a rear perspective view of the headrest structure 1. A mounting structure 79 and a mounting structure 81 are connected to the headrest support structure 3. Although six mounting structures are shown in FIG. 6, any number of mounting structures may be provided. The mounting structure 79 and the mounting structure 81 extend rearwardly from the headrest structure 1 in a direction away from the headrest support structure surface 5. Each mounting structure is shown in FIG. 4 between one of the webs 21 and another one of the webs 21. However, it is understood that each mounting structure can be provided in any suitable location on the headrest support structure 3. The support member 23 is connected to two mounting structures via fasteners 87, 89. A fastener 83 connects the support member 25 to the mounting structure 81 and a fastener 85 connects the support member 25 to the mounting structure 85. Fasteners 91, 93 are used to connect the support member 27 to two mounting structures. The fasteners may be screws, pins, rivets or any other suitable fastener or joining technique. The support member 23, the support member 25 and the support member 27 support the resilient headrest structure 7 and prevents slack from forming in the resilient headrest structure 7.

FIG. 6 is a rear perspective view of another embodiment of a headrest structure 1'. The headrest structure 1' includes a headrest support structure 3' and a resilient headrest structure 7'. The headrest support structure 3' is shown in FIG. 6 as a compliant band, however any suitable structure may form the headrest support structure 3'. The resilient headrest structure 7' is shown in FIG. 6 as a band, particularly a band formed of spring steel, however it is understand that any other material may be used to form the resilient headrest structure, such as an elastomeric plastic or a thermoplastic elastomer (TPE). The headrest support structure 3' has a headrest support structure surface 5'. The headrest support structure surface 5' defines a front surface of the headrest structure 1' and supports a user's head when the user applies his or her head to the headrest structure 1'. The resilient headrest structure 7' has a resilient headrest structure surface 9'. The resilient headrest structure surface 9' defines a rear surface of the headrest structure 1'. In another embodiment, the resilient headrest structure 7' may be arranged in front of the head support structure 3' such that the resilient headrest structure 7' forms a front surface of the headrest structure and the head support structure 3' defines a rear surface of the headrest structure.

The head support structure 3' is connected to webs 21'. Although seven webs 21' are shown in FIG. 6, it is understood that any number of webs 21' may be connected to head support structure 3'. The head support structure 3' may be integrally connected to the webs 21' as shown in FIG. 3. In another embodiment (not shown), the webs 21' may be formed separate from the head support structure 3' and connected to the head support structure 3'.

A release mechanism 19' is connected to the resilient headrest structure 7' for fixing and releasing the resilient headrest structure 7'. When the release mechanism 19' releases the resilient headrest structure 7', a user can rotate the head support structure 3' and the resilient headrest structure 7' with the user's hand or hands or by pushing on the head support structure 3' or by pressing a rear surface of the user's head on the headrest structure 1'. When the user moves the head support structure 3' and the resilient headrest structure 7' with the release mechanism 19' in a release position, the head support structure surface 5' remains at a constant length and the head support structure 5' has an arcuate contour when the user presses against the head support structure 3' and the resilient headrest structure 7'. When the user presses against the head support structure 3' and the resilient headrest structure 7' with the release mechanism 19' in the release position, the resilient headrest structure 7' becomes longer as it rotates about a headrest support member 11' and a headrest support member 13'. After the user presses against the head support structure 3' and the resilient headrest structure 7' to provide the head support structure 3' and the resilient headrest structure 7' with an arcuate contour, the release mechanism 19' is released by the user to move the release mechanism 19' from the release position to a fixed position to fix the head support structure 3' and the resilient headrest structure 7' such that the arcuate contour of the head support structure 3 and the arcuate contour of the resilient headrest structure 7' is maintained. When the release mechanism 19' is again actuated from the fixing position to the release position to release the resilient headrest structure 7', the head support structure 3' and the resilient headrest structure 7' move such that the head support structure 3' and the resilient headrest structure 7' have a substantially linear (flat, planar) contour due to the resilient material of the resilient headrest structure.

Mounting elements 80', 81', 82', 83', 84', 86' are connected to the head support structure 3'. Although FIG. 6 shows six mounting element, it is understood that any number of mounting elements may be provided. Supporting members (not shown in FIG. 6) are connected to the mounting elements as discussed with respect to the other embodiment of the headrest structure 1 shown in FIGS. 1-5.

Figure 7:
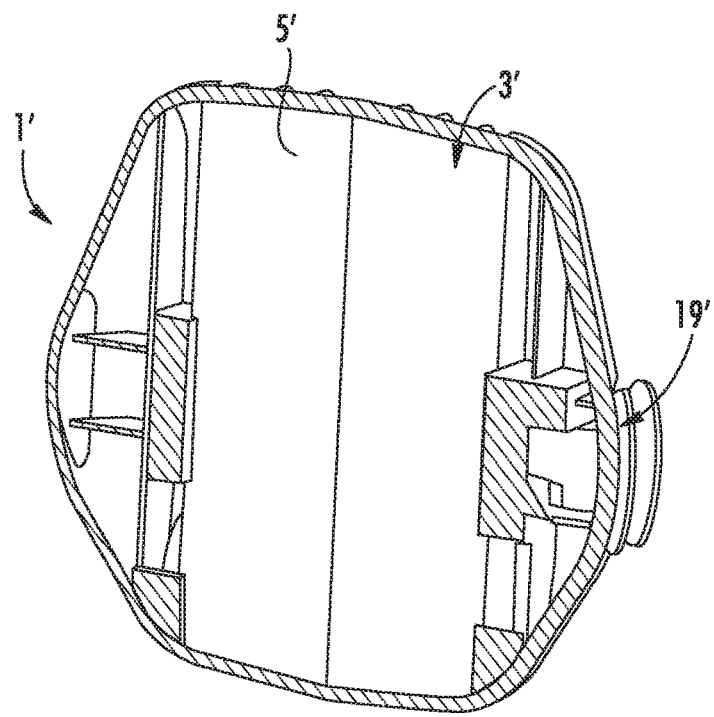
FIG. 7 is a front perspective view of the headrest structure of FIG. 6.

FIG. 7 is a front view of the headrest structure 1'. The user applies his or her head against the headrest support structure surface 5' so that the headrest structure 1' supports the user's head.

Figure 8:
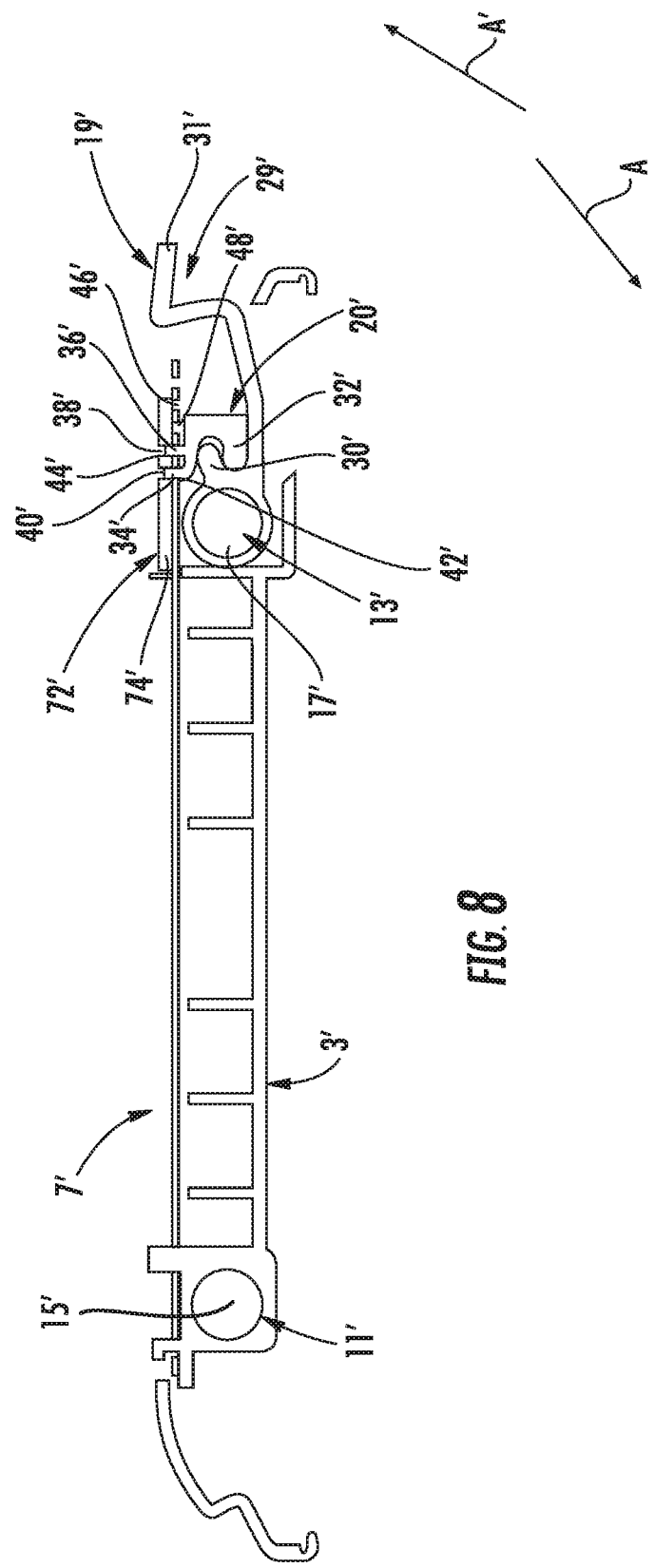
FIG. 8 is a sectional view of the headrest structure according to line 8-8 of FIG. 6.

FIG. 8 is a sectional view of the headrest structure 1' taken at line 8-8 of FIG. 6. The headrest structure 1' is connected to the headrest support member 11' and the headrest support member 13'. The headrest support member 11' is shown in the form of a rod 15', but it understood that the headrest support member 11' may be formed of any other suitable structure. The headrest support member 13' is shown in the form of a rod 17', but it is understood that the headrest support member 13' may be formed of any other suitable structure. The head support structure 3' extends at least between the head rest support member 11' and the headrest support member 13'. At least a portion of the resilient headrest structure 7' extends between the headrest support member 11' and the headrest support member 13'.

The release mechanism 19' has an actuator 29'. In FIG. 8, the actuator 29' is shown as a lever 31', however it is understood that the actuator 29' may be a push button, a switch, a toggle switch or any other suitable actuator structure. The actuator 29' is pivotably connected to the headrest support member 13' so that the actuator 29' is movable relative to the headrest support member 13'. The lever 31' has a projecting portion 30'. A latch mechanism 20' is connected to the lever 31'. The projecting portion 30' is in contact with the latch mechanism 20'. The latch mechanism 20' includes a fixing structure 32'. When the actuator 29' is actuated, the fixing structure 32' is moved based on movement of the actuator 29'. The lever 31' has a fixing structure portion 34' and a fixing structure portion 36' that is located at a spaced location from the fixing structure portion 34'. A fixing support structure 72' is arranged adjacent to the resilient headrest structure 7' on one side of the resilient headrest structure 7'. The fixing support structure 72' has an opening 38' and an opening 40'. The fixing support structure 72' is located opposite the fixing structure 32'. The fixing support structure 72' is shown in the form of a plate 74', however it is understood that any suitable support structure may be provided. When the actuator 29' is in a fixed position, the fixing structure portion 34' extends through an opening 42' in the resilient headrest structure 7' and at least a portion of the fixing structure portion 34' is arranged in the opening 40' of the fixing support structure 72' and the fixing structure portion 36' extends through an opening 44' in the resilient headrest structure 7' and at least a portion of the fixing structure portion 36' is arranged in the opening 38' of the fixing support structure 72'. When the actuator 29' is rotated in the clockwise direction A, a user can press his or her head or his or her hand or hands against the headrest support structure 3' to provide the headrest support structure 3' and the resilient headrest structure 7' with a non-planar contour, in particular an arcuate contour, and the actuator 29' can then be released allowing the actuator 29' to rotate in a counterclockwise direction A' to fix the resilient headrest structure 7' in position such that the arcuate contour of the resilient headrest structure 7' and the arcuate contour of the headrest support structure 3' are maintained. When the actuator 29' is rotated in the clockwise direction A to a release position, the fixing structure 32' moves in a direction away from the fixing support structure 72' and the resilient headrest structure 7' such that the fixing structure portion 34' is moved out of the opening 40' of the fixing support structure 72' and the opening 42' of the resilient headrest structure 7' and the fixing structure portion 36' is moved out of the opening 38' of the fixing support structure 72' and the opening 44' in the resilient headrest structure 7', which allows the resilient headrest structure 7' to move. When the actuator 29' is rotated in the counterclockwise direction A', the fixing structure 32' moves in a direction of the fixing support structure 72' and the resilient headrest structure 7' such that at least a portion of the fixing structure portion 34' moves into the opening 40' of the fixing support structure 72' and the opening 48' of the resilient headrest structure 7' and at least a portion of the fixing structure portion 36' moves into the opening 38' of the fixing support structure 72' and the opening 46' in the resilient headrest structure 7' to fix the position of the resilient headrest structure 7'. When the actuator 29' is rotated in the clockwise direction A after the arcuate contour of the resilient headrest structure 7' is formed, the resilient headrest structure 7' is no longer fixed by the fixing structure portion 34' and the fixing structure portion 36' so that the resilient headrest structure 7' returns (automatically) to a linear (flat, planar) contour due to the properties of the material of the resilient headrest structure 7'. When the actuator 29' is rotated in the clockwise direction A, the contour of the resilient headrest structure 7' and the contour of the headrest support structure 3' can be altered by the user. The release mechanism 19' allows for the resilient headrest structure 7' to be fixed in increments.

Figure 9:
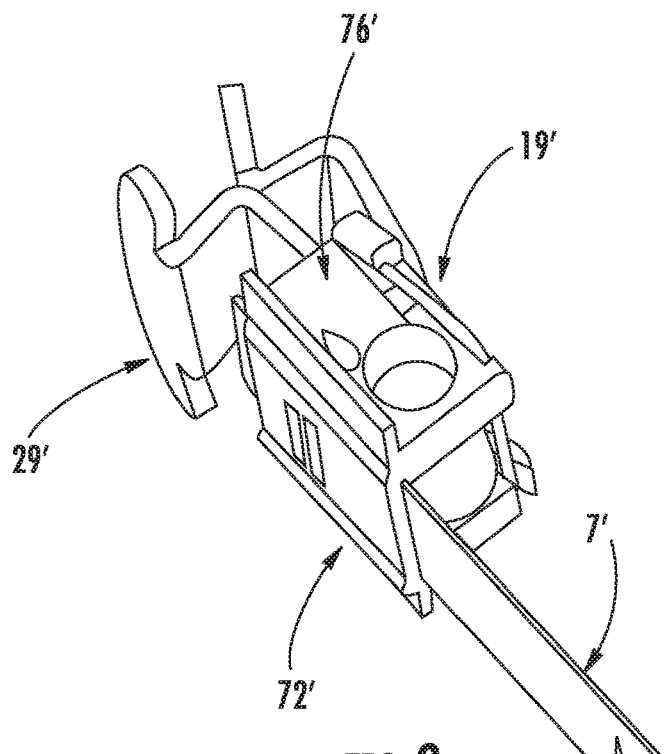
FIG. 9 is a detailed perspective view of a release mechanism.

FIG. 9 is a perspective view of the release mechanism 19'. The release mechanism 19' has a housing 76'. A portion of the actuator 29' and at least a portion of the fixing structure 34' are arranged in the housing 76'.

Figure 10:
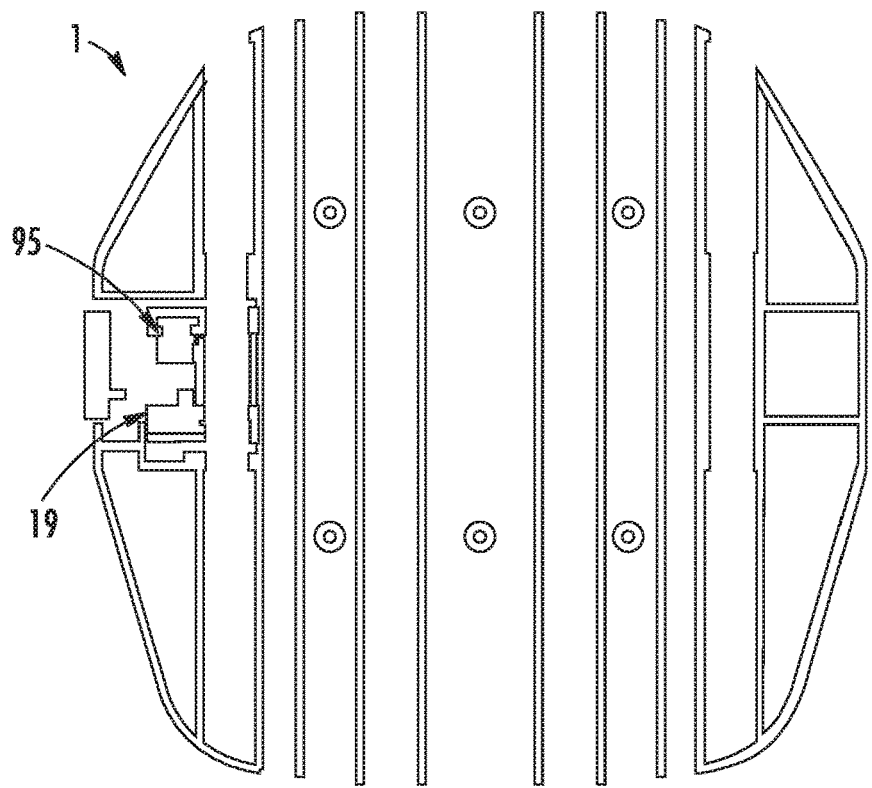
FIG. 10 is a rear view of the headrest structure of FIG. 1.

FIG. 10 is a rear view of the headrest structure 1. The release mechanism 19 is connected to a release and locking mechanism 95 for releasing the headrest structure 1 such that the headrest structure 1 is displaceable in a vertical direction and for locking the headrest structure 1 in a vertical position. This allows for simultaneous adjustment of a vertical displacement of the headrest structure 1 and adjustment of the resilient headrest structure 7.

Figure 11:
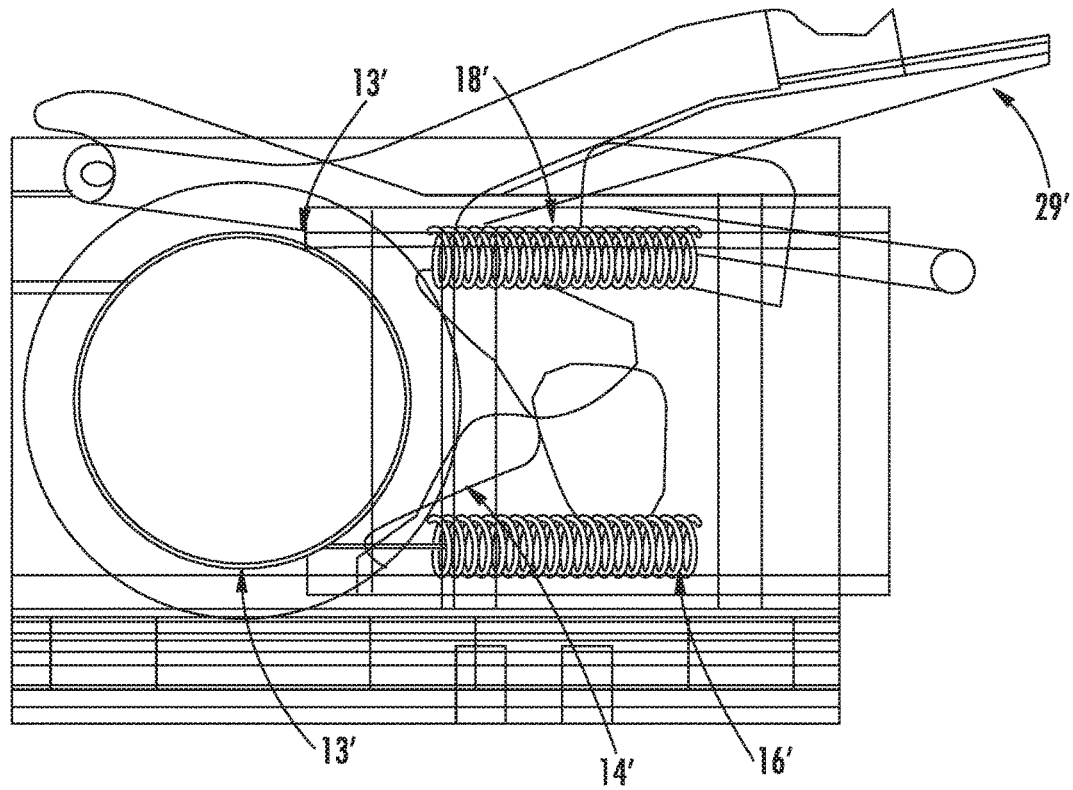
FIG. 11 is a cross sectional view of FIG. 9 according to line 11"-11" in FIG. 12.
Figure 12:
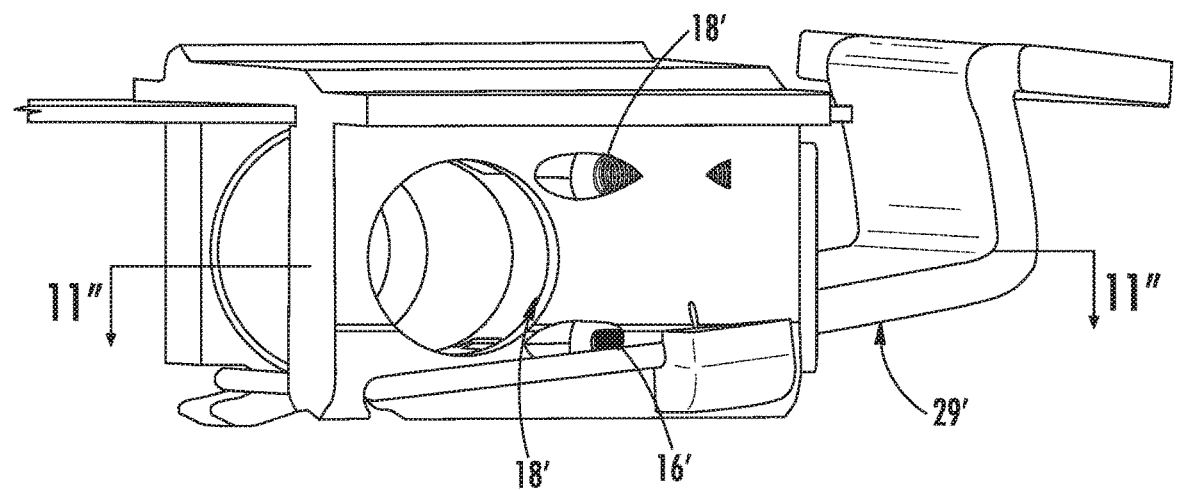
FIG. 12 is an enlarged perspective view of the release mechanism of FIG. 9.

FIG. 11 is a cross sectional view of FIG. 9 according to line 11"-11" of FIG. 12. A spring-loaded pin 14' is connected to the actuator 29'. The spring-loaded pin 14' is connected to springs 16', 18'. The headrest support member 13' has a notch 12'. The notch 12' receives at least a portion of the spring-loaded pin 14', which prevents vertical displacement of the headrest support member 13'. When the actuator 29' is actuated, the spring-loaded pin 14' moves away from the notch 12' and the springs 16', 18' are compressed to allow vertical displacement of the headrest support member 13' while simultaneously releasing the resilient headrest structure 7'. This provides for a simultaneous adjustment of the vertical position of the headrest support member 13', which allows the user to adjust the vertical position of the headrest structure 3', and adjustment of the resilient headrest structure 7'.

FIG. 12 is an enlarged perspective view of the release mechanism 19' with the headrest support member 13' removed. As shown in FIG. 12, the actuator 29' is actuated such that the spring-loaded pin 14' is retracted and the springs 16', 18' are compressed, which allows the headrest support member 13' to be unlocked for vertical displacement of the headrest support member 13' and simultaneously allows adjustment of the resilient headrest structure 7'.

Figure 13:
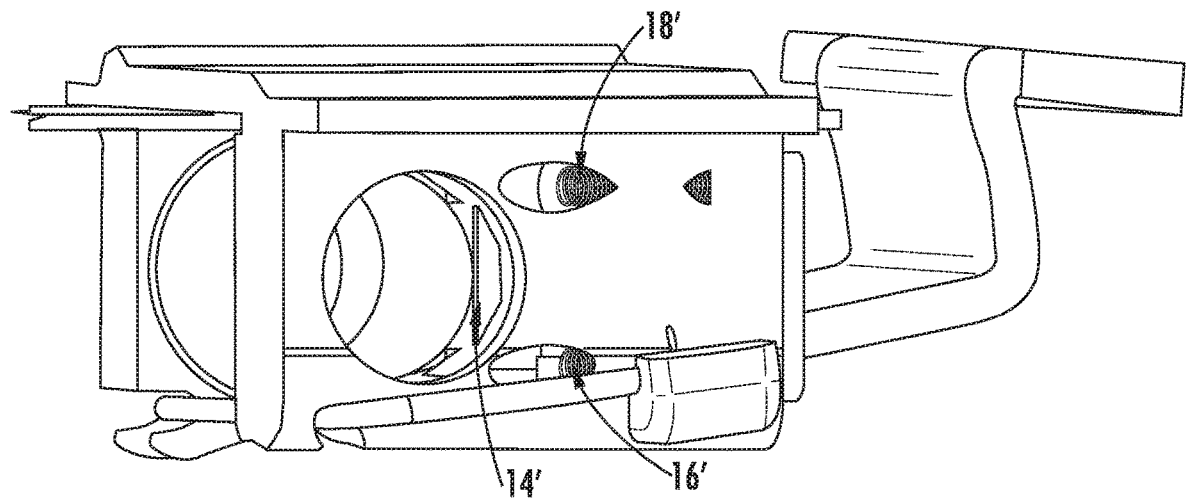
FIG. 13 is an enlarged perspective view of the release mechanism 19 of FIG. 9.

FIG. 13 is an enlarged perspective view of the release mechanism 19' with the headrest support member 13' removed. As shown in FIG. 13, the actuator 29' is not actuated such that the spring-loaded pin 14' is in an engaged position for engaging the headrest support member 13', which fixes the headrest support member 13' in position so that the headrest support member 13' cannot move in a vertical direction and simultaneously fixes the resilient headrest structure 7'.

Figure 14:
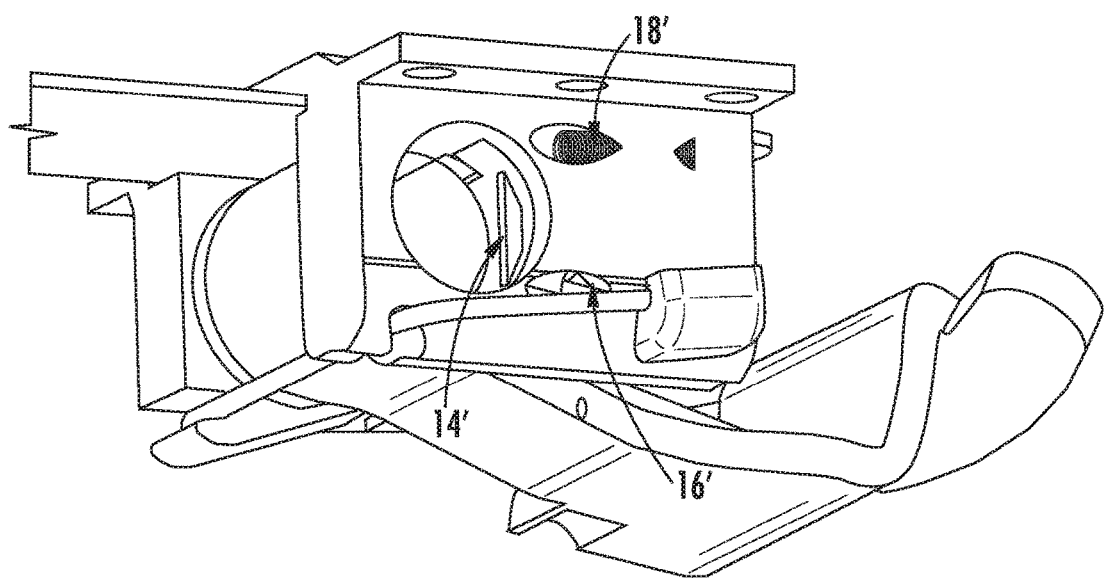
FIG. 14 is an enlarged perspective view of the release mechanism of FIG. 9 with a headrest support member removed.

FIG. 14 is an enlarged perspective view of the release mechanism 19' with the headrest support member 13' removed. FIG. 14 shows the spring-loaded pin 14' being retracted from the engaged position as the actuator 29' is actuated.

Figure 15:
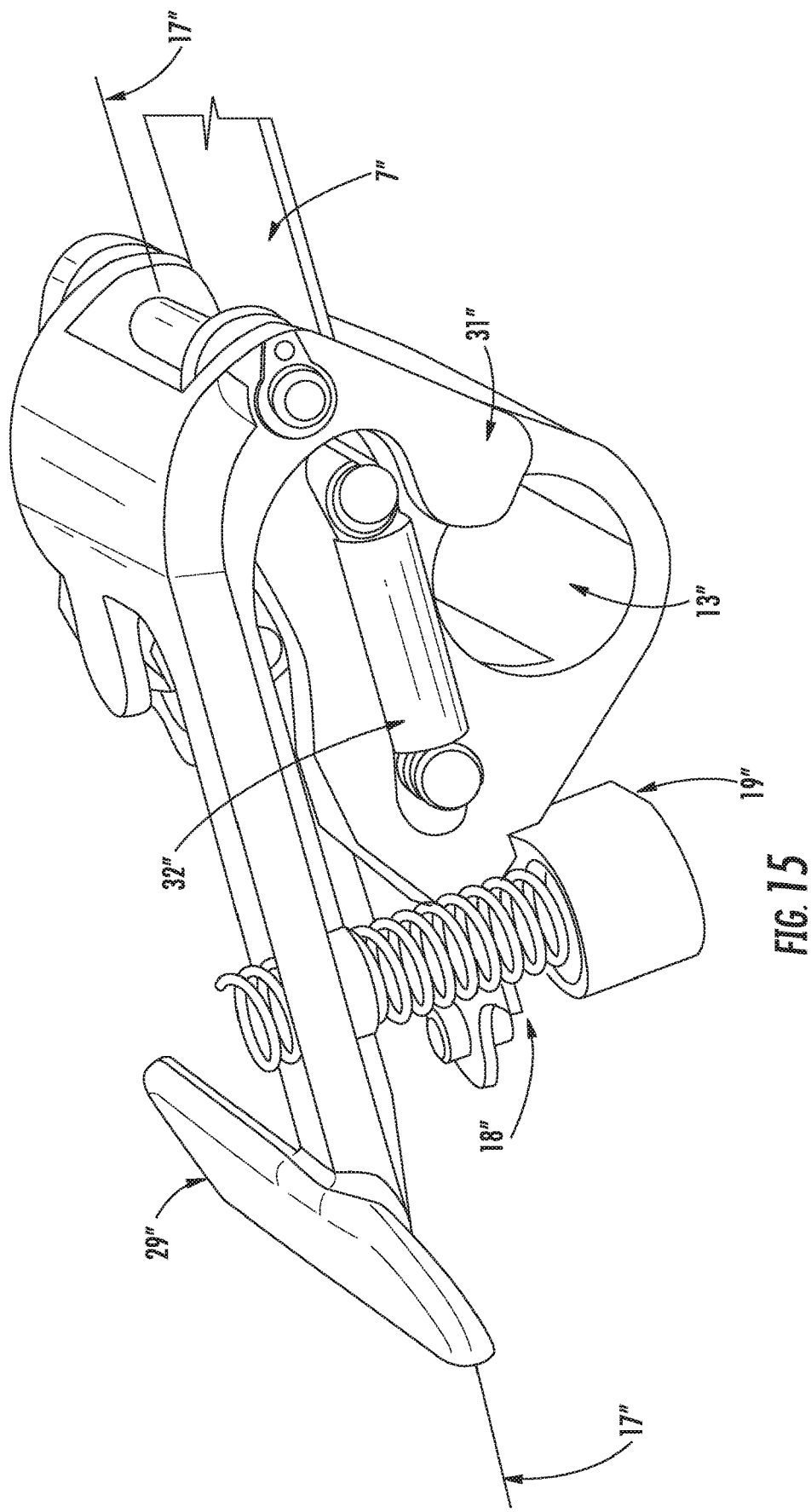
FIG. 15 is a perspective view of another embodiment of a release mechanism.

FIG. 15 is a perspective view of another embodiment of a release mechanism 19". The release mechanism 19" includes an actuator 29". The actuator 29" is shown in the form of a lever, but it is understood that any actuator may be used, including but not limited to a button, a toggle switch, a motor or any other suitable actuator. The actuator 29" is connected to a spring 18". The spring 18" allows the actuator 29" to return to an initial (non-engaged) position after the actuator 29" is actuated. The actuator 29" is connected to a latch mechanism 32". The actuator 29" is connected to a headrest support member contact member 31". The headrest support member contact portion 31" may be integrally connected to the actuator 29". The actuator 29" is shown in the initial position in FIG. 15. When the actuator 29" is in the initial position as shown in FIG. 15, the latch mechanism 32" fixes a resilient headrest structure 7" in a fixed position and the headrest support member contact portion 31" engages a headrest support member 13" to prevent vertical displacement of the headrest support member 13".

Figure 16:
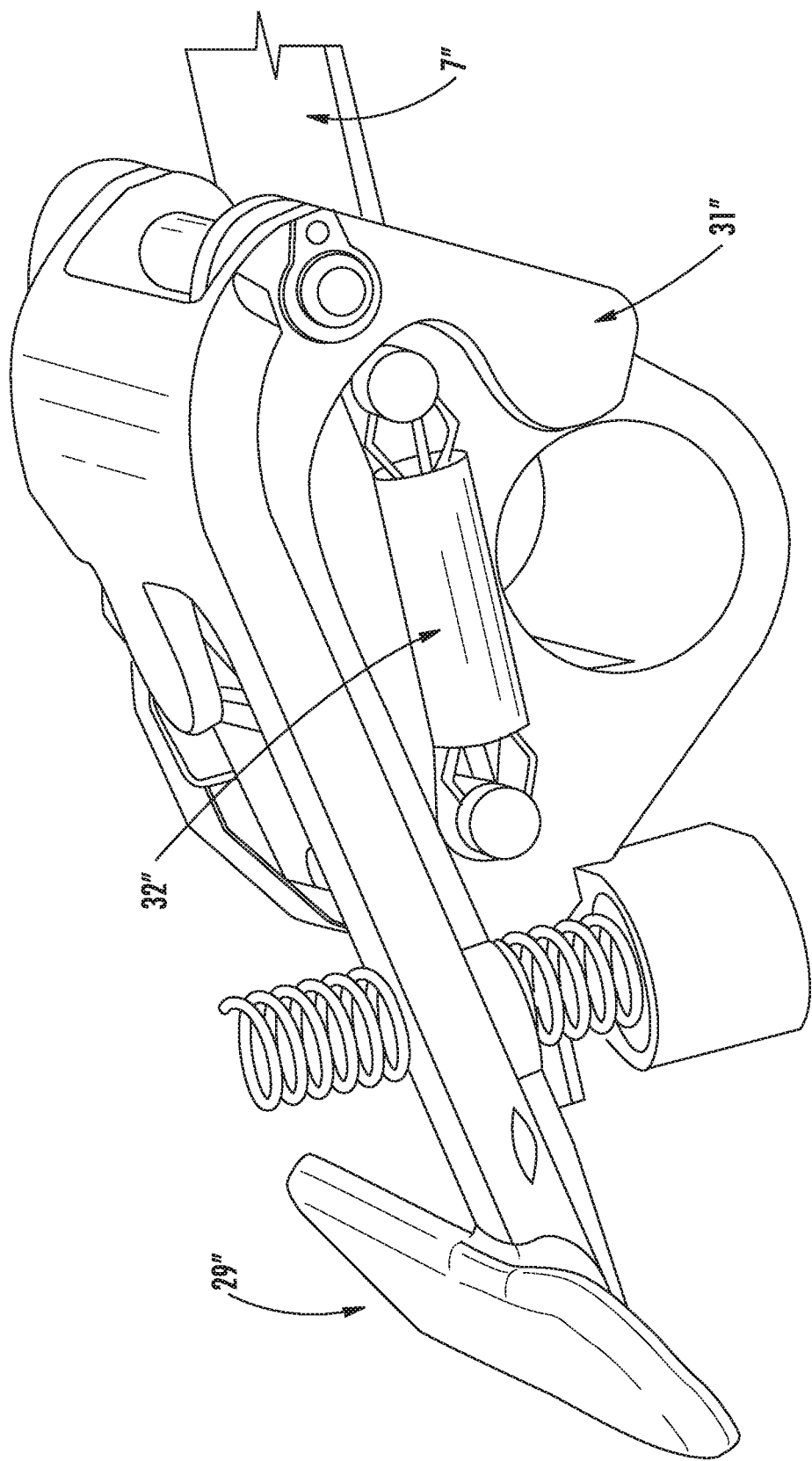
FIG. 16 is another perspective view of the release mechanism of FIG. 15.

FIG. 16 is a perspective view of the release mechanism 19" of FIG. 15 with the actuator 29" being actuated to move the actuator 29" from the initial position to an actuated (engaged) position. When the actuator 29" is actuated as shown in FIG. 16, the actuator 29" moves the latch mechanism 32" to release the resilient headrest structure 7" and simultaneously moves the headrest support contact member 31" away from the headrest support member 13" such that the headrest support contact member 31" is no longer in contact with the headrest support member 13", which allows for vertical displacement of the headrest support member 13". This provides for a simultaneous adjustment of the vertical position of the headrest support member 13", which allows the user to adjust the vertical position of a headrest structure, and adjustment of the resilient headrest structure 7".

Figure 17:
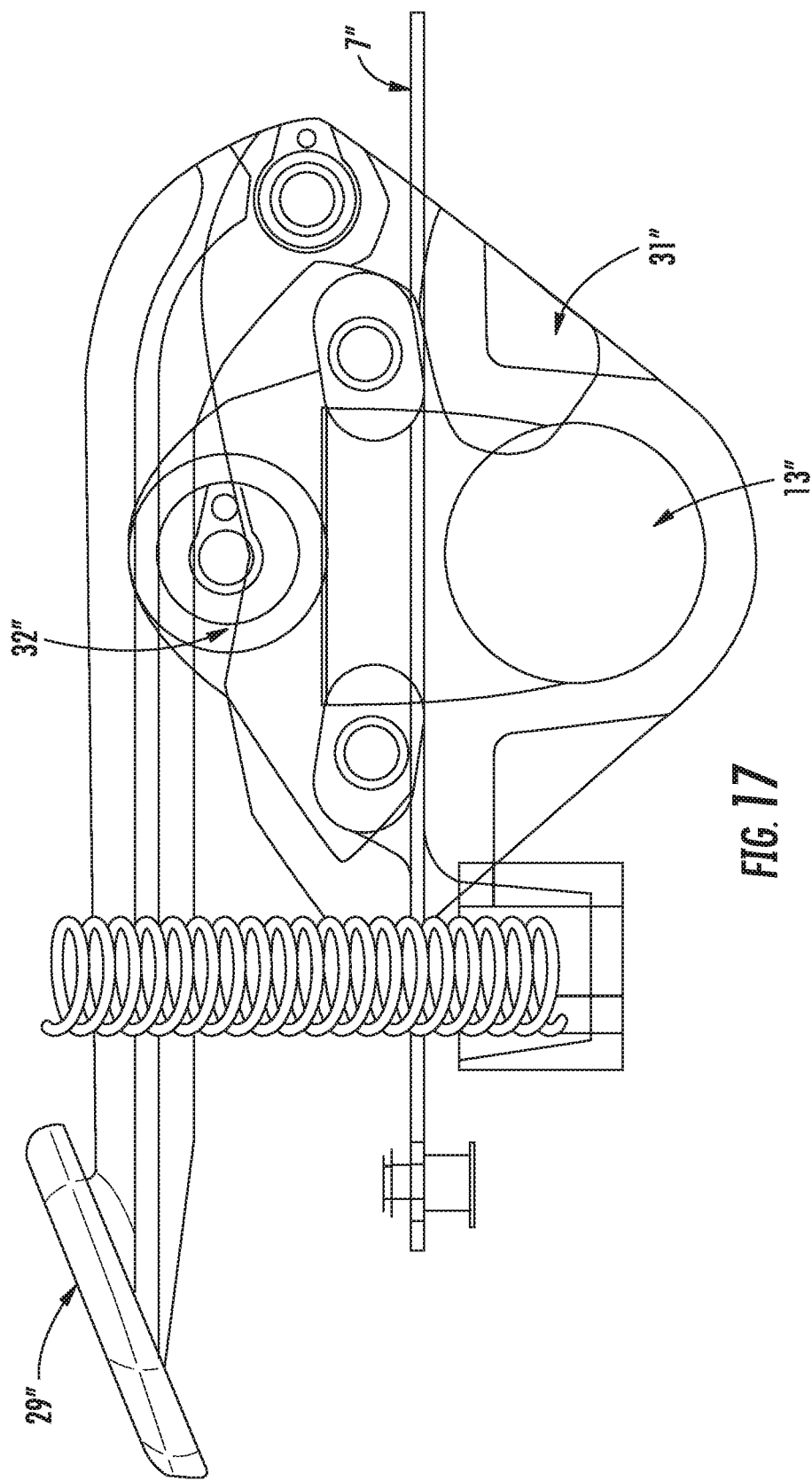
FIG. 17 is a cross sectional view of the release mechanism of FIG. 15.

FIG. 17 is a cross sectional view of the release mechanism 19" of FIG. 15 according to line 17"-17" shown in FIG. 15. As shown in FIG. 17, the actuator 29" is in the initial position and the resilient headrest structure 7" is fixed via the latch mechanism 32" and the headrest support contact member 31" contacts the headrest support member 13" to prevent vertical displacement of the headrest support member 13".

Figure 18:
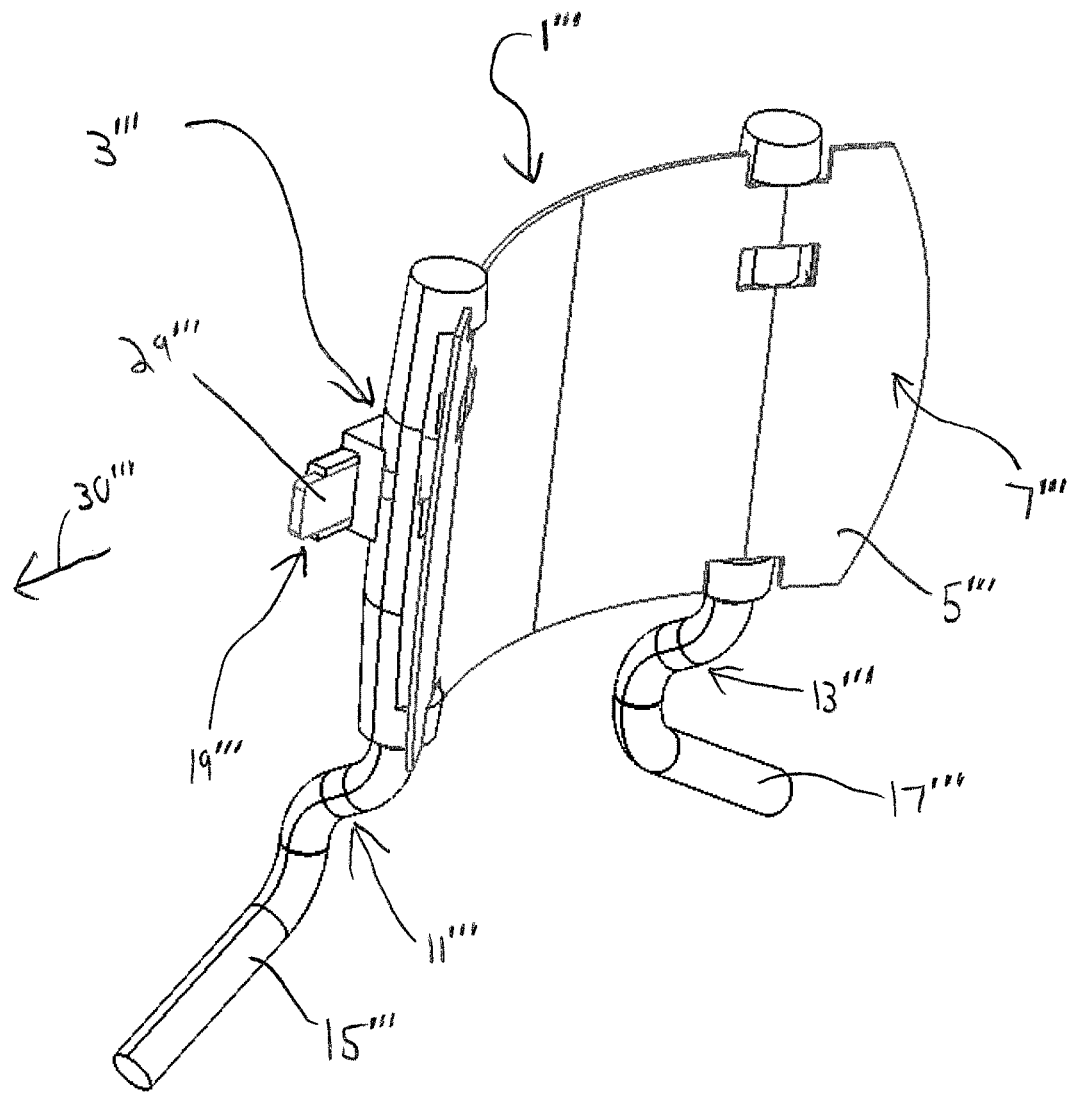
FIG. 18 is a perspective view of another embodiment of a headrest structure.

FIG. 18 is a perspective view of a headrest structure 1'''. The headrest structure 1''' is connected to a headrest support member 11''' and a headrest support member 13'''. The headrest support member 11''' is shown in the form of a rod 15''', but it is understood that the headrest support member 11''' may be formed of any other suitable structure. The headrest support member 13''' is shown in the form of a rod 17''', but it is understood that the headrest support member 13''' may be formed of any other suitable structure. The headrest structure 1''' includes a resilient headrest structure 7'''. The resilient headrest structure 7''' has a headrest support structure surface 5'''. The resilient headrest structure 7''' includes elastomeric material. The user applies his or her head against the headrest support structure surface 5''' so that the headrest structure 1''' support the user's head. A headrest support structure 3''' is connected to the headrest support member 11''' and the headrest support member 13'''. The headrest support structure 3''' is located behind the resilient headrest structure 7''', the headrest support member 11''' and the headrest support member 13''' with respect to a traveling direction of a vehicle. FIG. 18 shows a state in which a user has applied his or her head to the resilient headrest structure 7''' such that the resilient headrest structure 7''' has a non-planar contour, in particular an arcuate contour. A release/lock mechanism 19''' is provided in a space in the headrest support structure 3''' such that the release/lock mechanism 19''' is movable relative to the headrest support structure 3'''. The release/lock mechanism 19''' includes an actuator 29'''. The actuator 29''' is shown in the form of a sliding wedge. When the release/lock mechanism 19''' is disengaged and the user applies his or her head to the resilient headrest structure 7''', the resilient headrest structure 7''' moves to form the non-planar contour, in particular the arcuate contour, shown in FIG. 18. After the user applies his or her head to the resilient headrest structure 7''' to form the non-planar contour of the headrest structure 1''', the actuator 29''' moves to lock the resilient headrest structure 7''' such that the resilient headrest structure 7''' maintains the non-planar contour. In particular, a spring moves the actuator 29''' in the direction of arrow 30''' to lock the resilient headrest structure 7'''.

Figure 19:
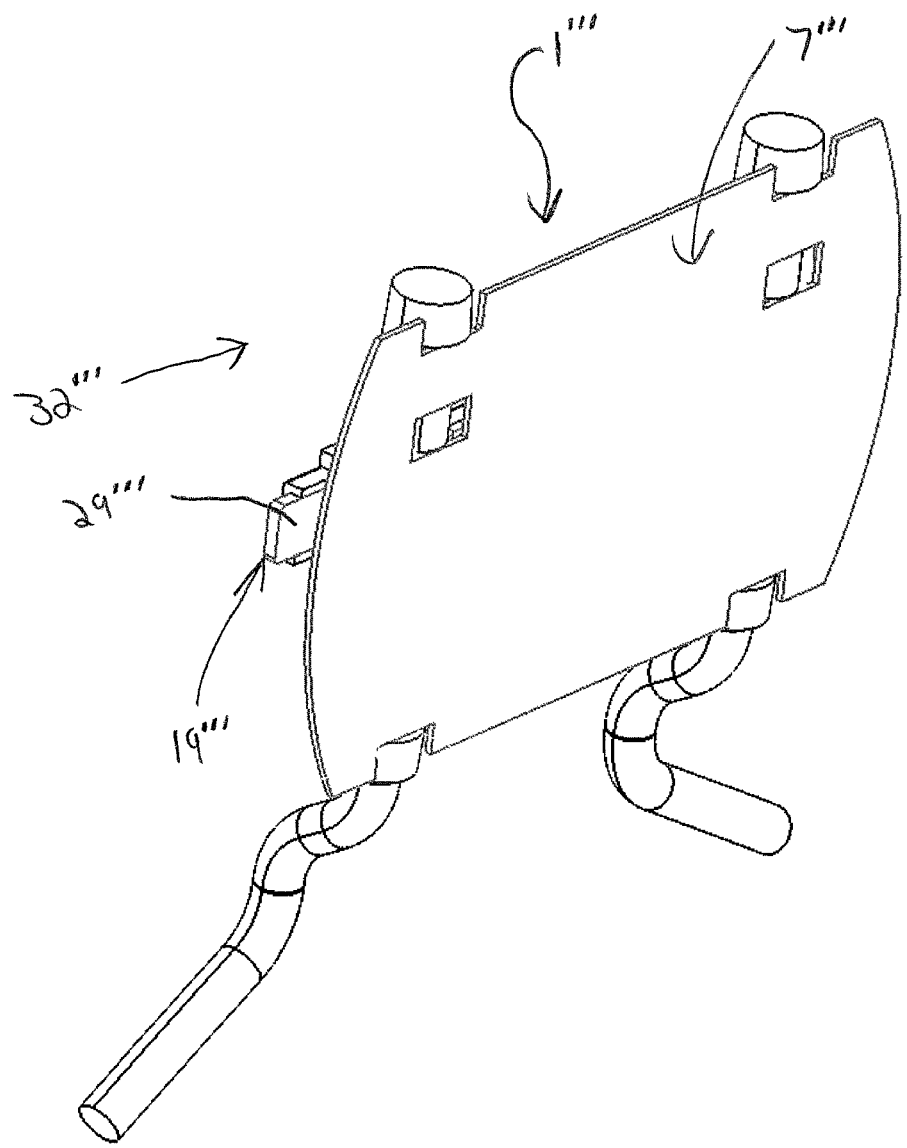
FIG. 19 is another perspective view of the headrest structure of FIG. 18.

FIG. 19 is a perspective view of the headrest structure 1'''. The resilient headrest structure 7''' has a planar contour, which is provided prior to the user applying his or her head or when the actuator 29''' is moved in the direction of arrow 32''' to release the resilient headrest structure 7'''.

Figure 20:
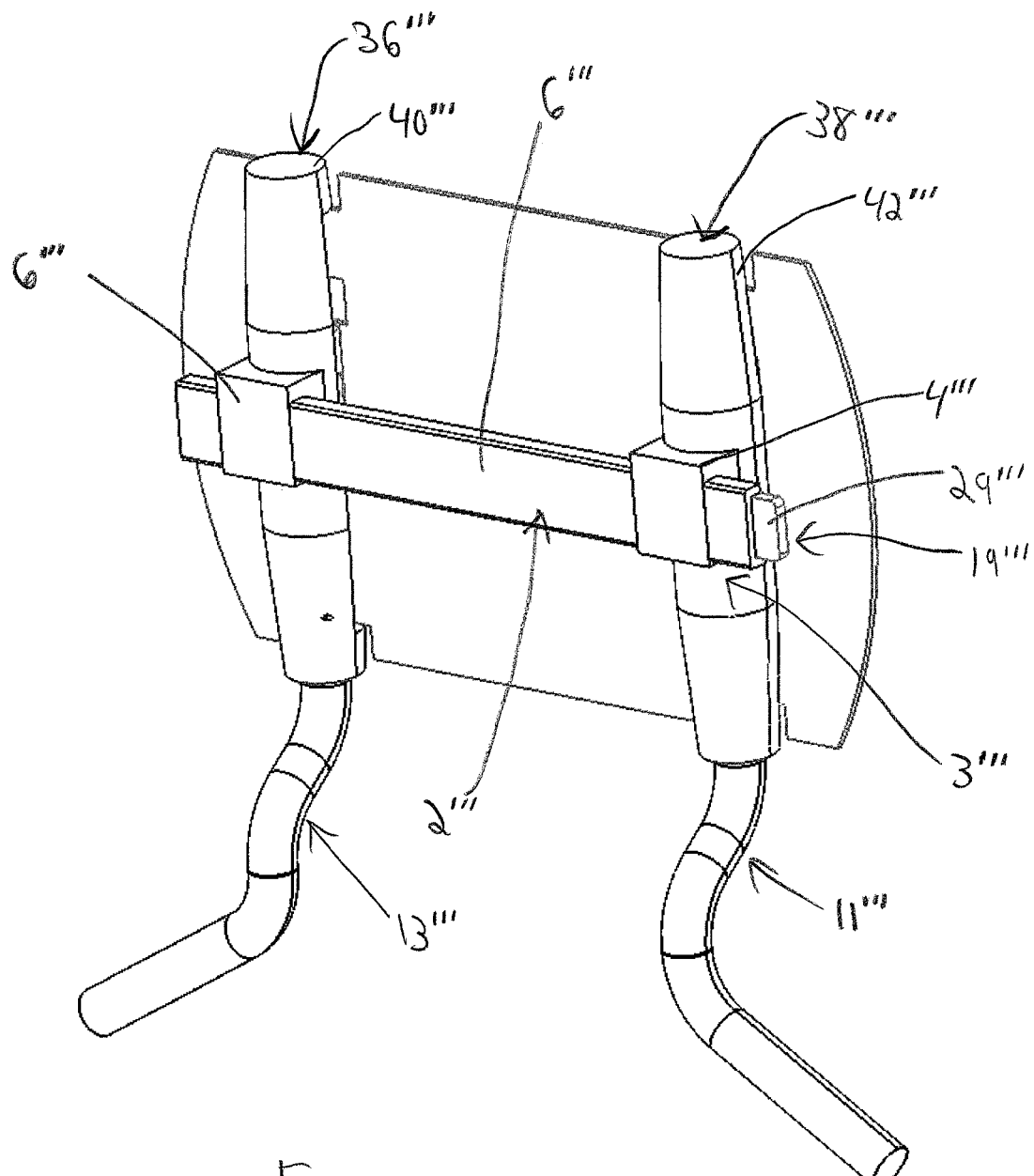
FIG. 20 is a rear view of the headrest structure of FIG. 19.

FIG. 20 is a rear view of the headrest structure 1''' of FIG. 19. The headrest support structure 3''' includes a frame structure 2'''. The frame structure 2''' includes a frame member 6''', connector elements 4''', 6''', a first cover structure 36''' and a second cover structure 38'''. The frame member 6''' is connected to the first cover structure 36''' and the second cover structure 38''' via connector elements 4''', 6'''. The actuator 29''' is movable (slidable) relative to the frame member 6'''. The frame structure 2''' is connected to headrest support member 11''' and the headrest support member 13'''. The first cover structure 36''' is shown in the form of a first sleeve 40''' and the second cover structure 38''' is shown in the form of a second sleeve 40'''. A portion of the headrest support member 11''' is inserted into a space in the sleeve 42''' and a portion of the headrest support member 13''' is inserted into a space in the sleeve 40''' to connect the frame structure 2''' to the headrest support members 11''', 13'''.

Figure 21:
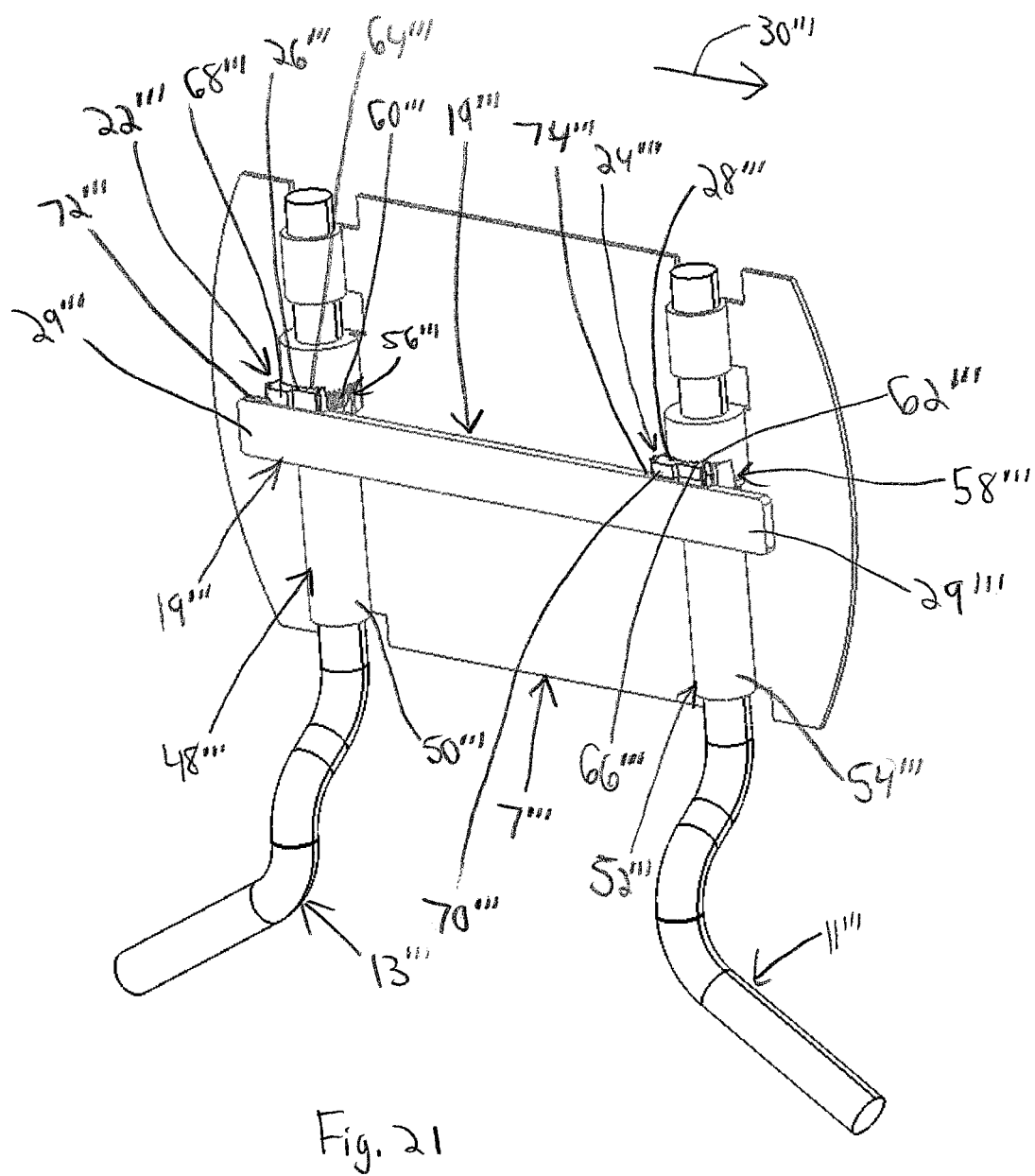
FIG. 21 is a rear view of the headrest structure of FIG. 20.

FIG. 21 is a rear view of the headrest structure 1''' of FIG. 20 with the frame structure 2''' removed. The resilient headrest structure 7''' has a first connector 48''' and a second connector 54''' that connect the resilient headrest structure 7''' to the headrest support member 11''' and the headrest support member 13'''. The first connector 48''' is shown in the form of a connecting sleeve 50'''. The second connector 52''' is shown in the form of a connecting sleeve 54'''. The first connector 48''' extends about the headrest support member 13''' and the second connector 54''' extends about the headrest support member 11''' (see FIG. 23). The first connector 48''' has a toothed portion 56''' with a plurality of teeth 60'''. The second connector 52''' has a toothed portion 58''' with a plurality of teeth 62'''. A first engaging element (constraining device) 22''', which is shown in the form of a sliding pawl 26''', has a plurality of teeth 64''' that engage the toothed portion 56'''. The first engaging element 22''' includes a projection 68'''. A second engaging element (constraining device) 24''', which is shown in the form of a sliding pawl 28''', has a plurality of teeth 66''' that engage the toothed portion 58'''. The second engaging element 24''' includes a projection 70'''. When a user applies his or her head to the resilient structure 7''' to form the non-planar contour, in particular the arcuate contour, of the resilient structure 7''', the toothed portion 56''' and the toothed portion 58''' rotate relative to the first engaging element 22''' and the second engaging element 24'''. Once a desired non-planar contour of the resilient headrest structure 7''' is reached, the actuator 29''' is moved, such as by the user or some mechanical mechanism, in the direction of arrow 30''' such that a portion 72''' of the actuator 29''' engages the projection 68''' and a portion 74''' of the actuator 29''' engages the projection 70''' to prevent rotation of the toothed portion 56''' and the toothed portion 58''' such that the resilient headrest structure 7''' is locked in position to maintain the non-planar contour of the resilient headrest structure 7'''. When the actuator 29''' is moved in a direction opposite the arrow 30''', the resilient headrest structure 7''' is unlocked such that the resilient headrest structure 7''' returns (automatically) to the position shown in FIG. 19. Although two toothed portions 56''', 58''' are shown, it is understood that a single toothed portion may be provided such that only one toothed portion can be locked to maintain the contour of the resilient headrest structure 7'''.

Figure 22:
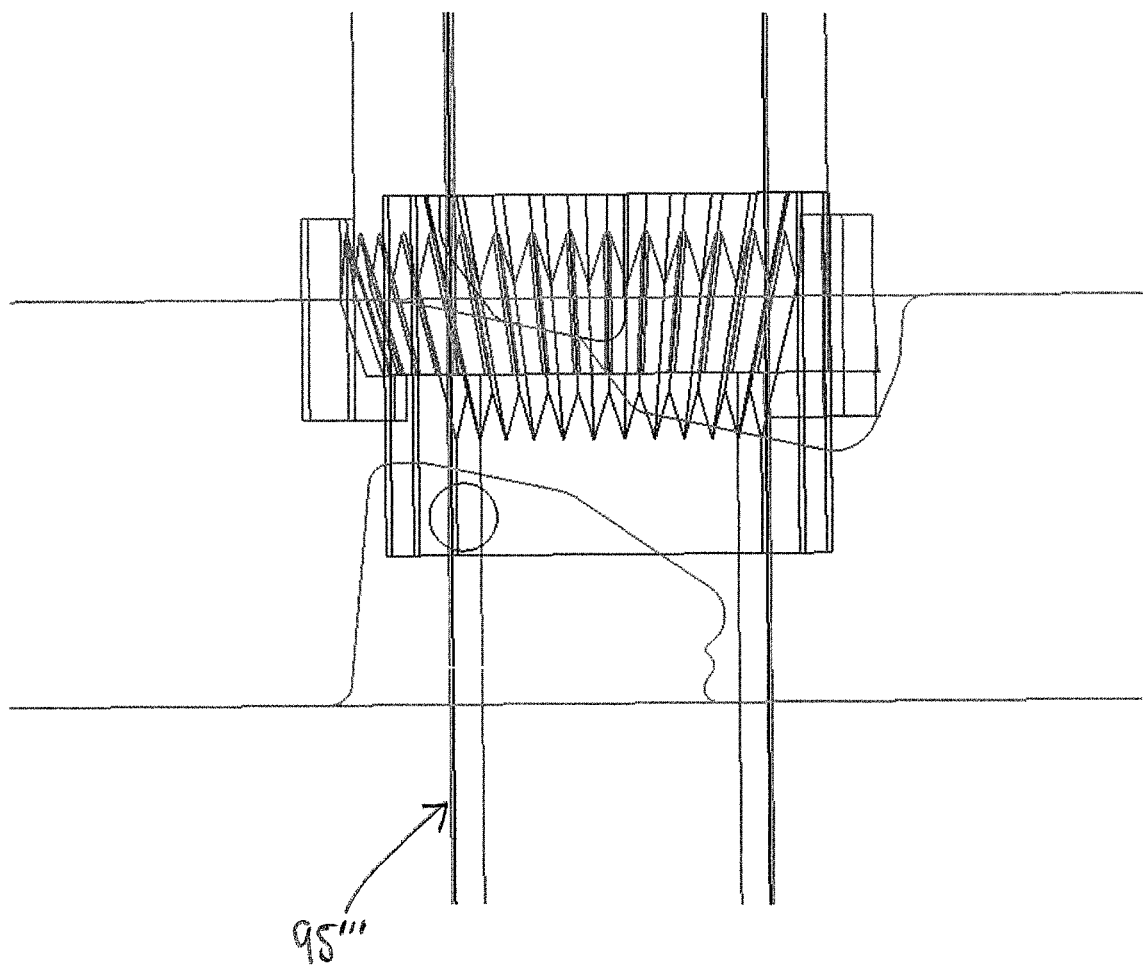
FIG. 22 is a sectional view of the headrest structure of FIG. 20.

FIG. 22 is a sectional view of the headrest structure 1''' of FIG. 20. A headrest lock mechanism 95''' is provided to lock the headrest structure 1''' to the headrest support member 11''' and the headrest support member 13''' such that the headrest structure 1''' cannot be moved in a vertical direction. The headrest lock mechanism 95''' can be actuated such that the headrest structure 1''' is movable in the vertical direction relative to the headrest support member 11''' and the headrest support member 13'''.

Figure 23:
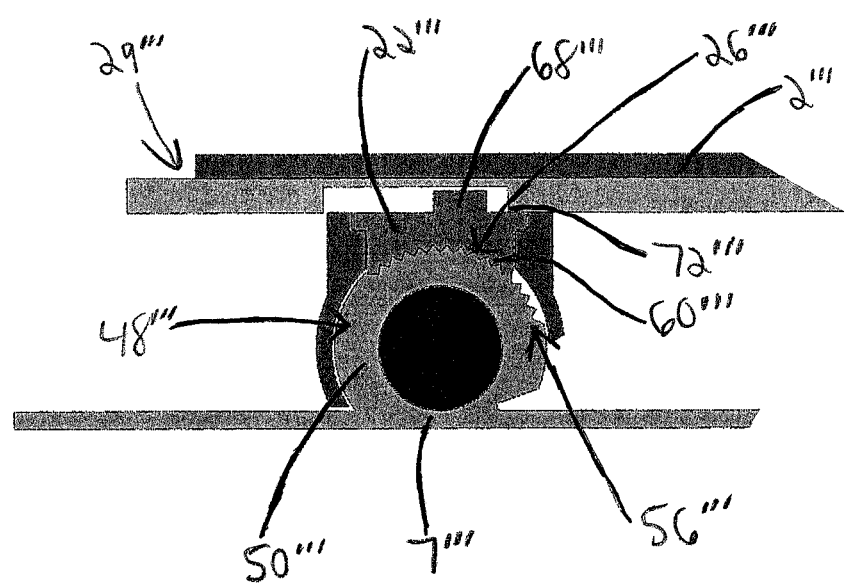
FIG. 23 is a sectional view of the headrest structure of FIG. 18.

FIG. 23 is an enlarged sectional view of the headrest structure 1''' in the area of the toothed portion of the first connector 48'''. It is understood that the same structure is provided in the area of the toothed portion of the second connector 58'''.

While specific embodiments of the invention have been shown and described in detail to illustrate the application of the principles of the invention, it will be understood that the invention may be embodied otherwise without departing from such principles.

What is claimed is:

1. A headrest comprising:
    a resilient headrest structure comprising a headrest structure surface, said resilient headrest structure surface defining a planar contour when said resilient headrest structure is fixed between two points, said headrest structure surface defining an arcuate contour when said headrest structure is loaded, wherein said headrest structure surface automatically returns to said planar contour from said arcuate contour when said resilient headrest structure is unloaded; and
    a release mechanism connected to said resilient headrest structure, said release mechanism comprising an actuator, said actuator being movable between at least a first position and a second position, said resilient headrest structure being in a fixed position with said actuator in said first position, said resilient headrest structure being movable with said actuator in said second position.

2. A headrest in accordance with claim 1, wherein said resilient headrest structure is an adjustable steel band.

3. A headrest in accordance with claim 1, wherein said actuator retains a defined contour of the headrest structure surface.

4. A headrest in accordance with claim 1, further comprising:
    a headrest support structure connected to said resilient headrest structure.

5. A headrest in accordance with claim 4, wherein said headrest support structure comprises a planar headrest support structure contour upon release of said actuator.

6. A headrest in accordance with claim 4, wherein said resilient headrest structure comprises a first length when said resilient headrest structure comprises said arcuate contour, said resilient headrest structure comprising a second length when said resilient headrest structure comprises said planar contour, wherein said first length is greater than said second length.

7. A headrest in accordance with claim 6, wherein a length of said headrest support structure is the same with said actuator in said first position and with said actuator in said second position.

8. A headrest in accordance with claim 1, further comprising:
    a headrest support structure, wherein said headrest support structure and said resilient headrest structure automatically define said planar contour upon release of said actuator.

9. A headrest in accordance with claim 8, wherein said headrest support structure defines one of a front surface and a rear surface of the headrest and said resilient headrest structure defines another one of the front surface and the rear surface of the headrest.

10. A headrest in accordance with claim 1, wherein each of said two fixed points is defined by a headrest support member.

11. A headrest in accordance with claim 1, wherein a parallel spring provides torsion about at least one of the two fixed points.

12. A headrest in accordance with claim 1, wherein material properties of the resilient headrest structure returns the headrest structure surface to the planar contour.

13. A method, comprising:
    providing a headrest structure comprising a resilient headrest structure and a release mechanism connected to said resilient headrest structure, said release mechanism comprising an actuator, said actuator being movable between at least a first position and a second position, said resilient headrest structure being in a fixed position with said actuator in said first position, said resilient headrest structure being movable with said actuator in said second position;
    changing said resilient headrest structure from a planar configuration to an arcuate configuration, said resilient headrest structure comprising a planar contour in said planar configuration, said resilient headrest structure comprising an arcuate contour in said arcuate configuration;
    fixing said resilient headrest structure in said arcuate configuration after said resilient headrest structure changes from said planar configuration to said arcuate configuration;
    releasing said resilient headrest structure such said resilient headrest structure automatically changes from said arcuate configuration to said planar configuration.

14. A suspension system in accordance with claim 12, further comprising:
    a lock mechanism comprising a locked state and an unlocked state, the headrest structure being in a fixed position in a vertical direction when the lock mechanism is in the locked state, the headrest structure being movable in the vertical direction when the lock mechanism is in the unlocked state.

* * * * *